United States Patent [19]

Sugisawa et al.

[11] Patent Number: 4,539,251
[45] Date of Patent: Sep. 3, 1985

[54] SURFACE COATED SIALON-BASE CERAMIC MATERIALS FOR TOOLS

[75] Inventors: Taijiro Sugisawa; Teruyoshi Tanase, both of Tokyo, Japan

[73] Assignee: Mitsubishi Kinzoku Kabushiki Kaisha, Tokyo, Japan

[21] Appl. No.: 622,221

[22] Filed: Jun. 19, 1984

[30] Foreign Application Priority Data

Jun. 30, 1983 [JP] Japan ................. 58-118831

[51] Int. Cl.$^3$ .................. B32B 15/04; B32B 9/04
[52] U.S. Cl. ...................... 428/216; 428/446; 428/698; 428/699; 428/701
[58] Field of Search ............ 428/336, 446, 698, 699, 428/701, 216

[56] References Cited

U.S. PATENT DOCUMENTS

| | | | |
|---|---|---|---|
| 3,895,219 | 7/1975 | Richerson et al. | 428/446 X |
| 3,955,038 | 5/1976 | Lindstrom et al. | 428/698 X |
| 4,101,703 | 7/1978 | Schintlmeister | 428/698 X |
| 4,185,141 | 1/1980 | Krejci et al. | 428/446 |
| 4,237,184 | 12/1980 | Gonseth et al. | 428/698 X |
| 4,284,687 | 8/1981 | Dreyer et al. | 428/336 |
| 4,336,304 | 6/1982 | Landingham et al. | 428/336 |

*Primary Examiner*—George F. Lesmes
*Assistant Examiner*—Nancy A. B. Swisher
*Attorney, Agent, or Firm*—Frishauf, Holtz, Goodman & Woodward

[57] ABSTRACT

A surface coated Sialon-base ceramic material for tools has its surface coated with a hard layer, and exhibits very excellent wear resistance when used in cutting tools and other wear resisting tools. The surface coated Sialon-base ceramic material comprises: a Sialon-base ceramic matrix and at least one hard coating layer formed over the surface of the above matrix, which consists essentially of at least one selected from the group consisting of carbide of Ti, Zr, or Hf, nitride thereof, carbo-nitride thereof, carbo-oxide thereof, and carbo-nitro-oxide thereof, preferably having a mean thickness within a range from 0.5 to 10 $\mu$m. The above surface coated Sialon-base ceramic material for tools may further include at least one second hard coating layer formed on a surface of the above first-mentioned hard coating layer, which consists essentially of at least one selected from the group consisting of oxide of Al and nitro-oxide thereof, wherein the first-mentioned hard coating layer exists as an intermediate layer whereas the second hard coating layer exists as a surface layer. Preferably, the second hard coating layer has a mean thickness within a range from 0.5 to 5 $\mu$m.

19 Claims, No Drawings

SURFACE COATED SIALON-BASE CERAMIC MATERIALS FOR TOOLS

BACKGROUND OF THE INVENTION

This invention relates to Sialon-base ceramic materials for tools, of which surfaces are coated with a hard layer, and more particularly to surface coated Sialon-base ceramic materials for tools which exhibit very excellent wear resistance when used in cutting tools and other wear-resisting tools.

In recent years, silicon nitride-base ceramic materials have become used in cutting tools and other wear-resisting tools. However, such ceramic materials suffer from low sinterability since silicon nitride (hereinafter referred to as "$Si_3N_4$") is a compound having a strong covalent bond. Therefore, many ceramic materials of this type have conventionally been produced by means of hot pressing. According to the conventional hot pressing method, however, it is difficult to obtain products having complicated shapes from $Si_3N_4$-base ceramic materials, and the method suffers from low yield.

Attempts have been made to employ in cutting tools and other wear-resisting tools Sialon-base ceramic materials, which have higher sinterability than $Si_3N_4$ and also have high thermal shock resistance as well as oxidation resistance. Such Sialon-base ceramic materials are composed mainly of a compound obtained by substituting Al and O, respectively, for part of Si and part of N in the crystal lattice of $\beta$-$Si_3N_4$, that is, $\beta$-Sialon expressed by a chemical formula $Si_{6-z}Al_zO_zN_{8-z}$ where z is larger than 0 but not more than 4.3. Such Sialon-base ceramic materials have high toughness but do not possess sufficient hardness, that is, their hardness is e.g. of the order of 92 in terms of Rockwell hardness (A scale). Therefore, such Sialon-base ceramic materials cannot show satisfactory wear resistance when used in cutting tools and other wear-resisting tools.

OBJECT AND SUMMARY OF THE INVENTION

It is the object of the invention to provide surface coated Sialon-base ceramic materials for tools, which possess both high hardness and excellent sinterability and can therefore show very excellent wear resistance when used in cutting tools and other wear-resisting tools.

The present invention provides a surface coated Sialon-base ceramic material for tools, which comprises:

a Sialon-base ceramic matrix consisting essentially of (a) 3–30 percent by volume at least one selected from the group consisting of carbide of each of the metals exclusive of Cr in the groups 4a, 5a, and 6a of the periodic table of elements, nitride thereof, oxide thereof, and solid solution of at least two of the carbide, the nitride, and the oxide, (b) 1–20 percent by volume at least one combined phase-forming component selected from the group consisting of oxide of Li, Na, Ca, Mg, Y, any rare earth element, Si, or Al, and nitride thereof, and (c) the balance of $\beta$-Sialon expressed by a chemical formula $Si_{6-z}Al_zO_zN_{8-z}$, z being larger than 0 but not more than 4.3, and $\alpha$-Sialon expressed by a chemical formula $M_x(Si,Al)_{12}(O,N)_{16}$, x being larger than 0 but not more than 2, M representing at least one selected from the group consisting of Li, Na, Ca, Mg, Y, and any rare earth element, and inevitable impurities, wherein the ratio of the $\alpha$-Sialon/the $\beta$-Sialon is within a range from 5/95 to 95/5 in volume; and at least one hard coating layer formed over the surface of the above matrix, which consists essentially of at least one selected from the group consisting of carbide of Ti, Zr, or Hf, nitride thereof, carbo-nitride thereof, carbo-oxide thereof, and carbo-nitro-oxide thereof.

Preferably, the above hard coating layer has a mean layer thickness within a range from 0.5 to 10 $\mu$m.

Preferably, the above surface coated Sialon-base ceramic material for tools may further include at least one second hard coating layer formed over the surface of the above first-mentioned hard coating layer, the second hard coating layer consisting essentially of at least one selected from the group consisting of oxide of Al and nitro-oxide thereof, wherein the first-mentioned hard coating layer exists as an intermediate layer whereas the second hard coating layer exists as a surface layer.

Preferably, the second hard coating layer has a mean layer thickness within a range from 0.5 to 5 $\mu$m.

DETAILED DESCRIPTION

Under the aforestated circumstances, the present applicants have made many studies in order to improve conventional Sialon-base ceramic materials composed mainly of the aforementioned $\beta$-Sialon so as to impart higher hardness and accordingly excellent wear resistance to the ceramic materials, without sacrificing the good sinterability thereof. As a result, the applicants have reached the following findings:

(a) A ceramic material will have enhanced hardness and accordingly excellent wear resistance, if it contains, together with the aforementioned $\beta$-Sialon, a compound obtained by substituting part of Si and part of N forming the crystal lattice of $\alpha$-$Si_3N_4$ by Al and by O, respectively, and also contains at least one selected from the group consisting of Li, Na, Ca, Mg, Y, and any rare earth elements (these elements will be hereinafter called generically "M") wherein the M is present interstitially in the crystal lattice in the form of solid solution, that is, an $\alpha$-Sialon expressed by a chemical formula $M_x(Si,Al)_{12}(O,N)_{16}$ wherein x is larger than 0 but not more than 2;

(b) If a ceramic material containing both $\alpha$-Sialon and $\beta$-Sialon as mentioned above also contains at least one combined phase-forming component selected from the group consisting of oxide of each of the elements previously stated as the M, Si, or Al, and nitride thereof (these compounds will be hereinafter called generically "the compounds of metals"), such combined phase-forming component(s) contained in the ceramic material will have a sufficiently low melting point and therefore will form a liquid phase during sintering of the ceramic material to promote the sintering. In addition, in the sintered ceramic material, the combined phase-forming component(s) exists in a vitreous or crystal state at the grain boundary of the Sialon to densify the sintered ceramic material and accordingly enhance the hardness thereof;

(c) If a Sialon-base ceramic material consisting essentially of $\alpha$-Sialon, $\beta$-Sialon, and at least one of the compounds of metals as stated above in (b) further contains at least one cubic structure compound selected from the group consisting of carbide of each of the metals exclusive of Cr in the groups 4a, 5a, and 6a of the periodic table of elements, nitride thereof, oxide thereof, and solid solution of at least two of these compounds (these compounds will be hereinafter called generically "the cubic structure compounds"), the Sialon-base ceramic material will have enhanced oxidation resistance as well as enhanced hardness and accordingly further improved wear resistance. Further, as a matrix, it has an increased degree of bonding with a hard coating layer, hereinafter referred to;

(d) If on a surface of a matrix formed of the Sialon-base ceramic material consisting essentially of α-Sialon, β-Sialon, at least one of the cubic structure compounds, and at least one of the compounds of metals as a combined phase-forming component as stated above in (c) is formed a hard coating layer which is formed of a layer of one or layers of at least two selected from the group consisting of carbide of Ti, Zr, or Hf, nitride thereof, carbo-nitride thereof, carbo-oxide thereof, and carbo-nitro-oxide thereof (these compounds will be hereinafter called generically "the compounds of 4a group metals"), the surface coated Sialon-base ceramic material will have further enhanced wear resistance; and (e) If further on the hard coating layer formed of at least one of the compounds of 4a group metals as stated above in (d) is formed a second hard coating layer which is formed of a layer of one or layers of two selected from the group consisting of oxide of Al, and nitro-oxide thereof (these compounds will be hereinafter called generically "the compounds of Al"), the resulting multicoated Sialon-base ceramic material will show excellent wear resistance, particularly in high speed cutting of cast iron.

The present invention is based upon the above findings.

Sialon-base ceramic materials according to the invention have the aforestated chemical compositions.

In Sialon-base ceramic materials according to the invention, the ratio $(\alpha/\beta)$ of the α-Sialon/the β-Sialon is limited within a range from 5/95 to 95/5 in volume. If the ratio of the α-Sialon is less than 5, the required increase of the hardness of the ceramic material cannot be obtained, while if the ratio of the α-Sialon exceeds 95, the sinterability of the ceramic material will be degraded. Best results of enhancement of the hardness and the wear resistance can be obtained if the ratio of the α-Sialon is within a range from 25/75 to 95/5 in volume.

The β-Sialon, which is expressed by the chemical formula $Si_{6-z}Al_zO_zN_{8-z}$ as stated before, must satisfy that the value of z is in the relationship of $0 < z \leq 4.3$, because no composition of the β-Sialon with the value of z more than 4.3 can exist. Even within the above range, if the value of z is large, large pores can be formed in the resulting ceramic materials, and also the strength of the resulting ceramic materials will decrease. Therefore, the value of z should desirably be larger than 0 but not more than 2.0.

The α-Sialon, which is expressed by the chemical formula $M_x(Si,Al)_{12}(O,N)_{16}$ as stated before, should satisfy that the value of x is in the relationship of $0 < x \leq 2$, because if the value of x exceeds 2, the M cannot completely occupy in the form of solid solution holes between atoms in the crystal lattice. The ratio between Si, Al, O, and N varies in dependence on the kind of the M and the value of x and assumes such a value that the positive valence and the negative valence are equal to each other.

The content of the above combined phase-forming component is limited within a range from 1 to 20 percent by volume. If the same content is less than 1 percent by volume, the ceramic materials cannot have desired high density, while in excess of 20 percent by volume, reduced strength of the ceramic materials will result. Best results can be obtained if the same content is within a range from 2 to 10 percent by volume.

The content of the above cubic structure compounds is limited within a range from 3 to 30 percent by volume. If the content is less than 3 percent by volume, the ceramic materials cannot have desired properties as mentioned above, while in excess of 30 percent by volume, the excellent wear resistance, thermal shock resistance, and oxidation resistance of both of α-Sialon and β-Sialon cannot be achieved to a required extent, which can result in occurrence of cracks from thermal shock, easily causing chipping.

The mean layer thickness of the above hard coating layer of the compounds of 4a group metals should desirably be limited within a range from 0.5 to 10 μm. If the layer thickness is less than 0.5 μm, the ceramic materials cannot have desired wear resistance, whereas in excess of 10 μm, chipping can occur in the coating layer, shortening the effective life of the ceramic materials. Best results can be obtained of the same mean layer thickness is within a range from 1 to 5 μm.

The mean layer thickness of the above second hard coating layer of the compounds of Al should desirably be limited within a range from 0.5 to 5 μm. If the mean layer thickness is less than 0.5 μm, the ceramic material cannot have desired properties as mentioned above, whereas in excess of 5 μm, no further improvement is obtained, which is not only uneconomical but also apt to cause chipping. Best results can be obtained if the same thickness is within a range from 0.5 to 3 μm.

To manufacture surface coated Sialon-base ceramic materials for tools according to the invention, the following starting powders are first prepared by way of example:

(i) Powders of compounds for forming α-Sialon and β-Sialon, which may be any one of the following combinations (a)–(c):

(a) Powder of $Si_3N_4$ + powder of $Al_2O_3$ + powder of AlN;

(b) Powder of $Si_3N_4$ + powder of $SiO_2$ + powder of AlN;

(c) Powder of $Si_2ON_2$ + Powder of AlN;

(ii) Powders of the cubic structure compounds; and (iii) Powders of the compounds of metals as combined phase-forming components.

The above $Si_3N_4$ should preferably have a high α phase content.

These starting powders are blended into a predetermined composition. The blending ratio should be so set that the ratios of Al and N are larger than those calculated from the chemical formula of the β-Sialon. The blended powders are mixed and micronized, and the resulting mixture is subjected to hot pressing at a temperature falling within a range from 1550° to 1800° C. Alternatively, a green compact prepared from the mixture is subjected to sintering at a temperature falling within the same range as above.

If such green compact is directly exposed to the atmospheric gas during sintering, the heat-affected surface layer of the resulting sintered ceramic material can have an increased thickness. Therefore, preferably such green compact should be buried in powder of $Si_3N_4$ during sintering. Further, the sintering should be carried out in an atmospheric gas containing $N_2$ so as to restrain decomposition of the $Si_3N_4$ during sintering. Preferably, such atmospheric gas may consist of $N_2$ alone, though a mixture gas of $N_2$ and $H_2$ or $N_2$ and Ar may be used instead. The pressure of the atmospheric gas may preferably be set at 1 atmospheric pressure, though it may be set at approximately 0.9 atmospheric pressure. Although more preferably the same pressure may be set at a value higher than 1 atmospheric pressure, a special sintering furnace will then be required. The sintering temperature should range from 1550° to 1800° C. as stated before, and more preferably from 1650° to 1750° C.

Further, ceramic materials thus sintered may further be subjected to hot hydrostatic pressure sintering if required, to densify the ceramic materials.

To form a hard coating layer of the surface coated Sialon-base ceramic material according to the invention, a conventional method such as chemical deposition or physical deposition may be employed. Preferably, the chemical deposition should be employed since it is more advantageous in enhancing the degree of bonding between the matrix and the hard layer.

Examples of the ceramic materials according to the invention will now be described in detail.

EXAMPLE 1

The following starting powders were prepared: (i) powder of $Si_3N_4$ of which the $\alpha$ phase content is 90 percent by volume having a mean grain size of 0.8 $\mu$m, powder of $\alpha$-$Al_2O_3$ having a mean grain size of 0.6 $\mu$m, powder of AlN having a mean grain size of 1.5 $\mu$m, as the Sialon-forming compounds; (ii) powder of CaO having a mean grain size of 0.8 $\mu$m, powder of MgO having a mean grain size of 0.6 $\mu$m, powder of $Er_2O_3$ having a mean grain size of 1.1 $\mu$m, powder of $Li_2O$, powder of $Na_2O$, powder of $Y_2O_3$, powder of $La_2O_3$, and powder of YN, all having a mean grain size of 1.0 $\mu$m, as the compounds of metals which are combined phase-forming components; and (iii) powder of TiC, powder of TiN, powder of ZrC, powder of HfC, powder of NbC, powder of TaN, powder of $(Ti_{0.8}V_{0.2})C_{0.5}N_{0.5}$, powder of $(Ti_{0.7}W_{0.3})C_{0.5}N_{0.5}$, powder of $(Ti_{0.7}M_{0.3})C$, and powder of $TiC_{0.3}N_{0.6}O_{0.1}$, all having a mean grain size of 0.9 $\mu$m, as the cubic structure compounds.

These starting powders were blended into compositions shown in Table 1. Each of the blended powders was mixed and micronized in a wet-type ball mill for 72 hours, then dried, and charged into a hot-pressing graphite die. In the graphite die, each of the resulting mixtures was subjected to hot press sintering in the atmosphere under a pressure of 200 Kg/cm$^2$, at a temperature of 1700° C., and for a retention time of 1 hour, to obtain a Sialon-base ceramic matrix according to the present invention.

TABLE 1

| SPECIMEN | Si₃N₄ | Al₂O₃ | AlN | CUBIC STRUCTURE COMPOUNDS | COMPOUNDS AS COMBINED PHASEFORMING COMPONENTS | α/β RATIO | MATRIX HARDNESS (H$_R$A) | HARD COATING LAYER OF COMPOUNDS OF 4a GROUP METALS COMPOSITION | LAYER THICKNESS (μm) | HARD COATING LAYER OF COMPOUNDS OF Al COMPOSITION | LAYER THICKNESS (μm) | FLANK WEAR (mm) |
|---|---|---|---|---|---|---|---|---|---|---|---|---|
| SURFACE COATED CUTTING INSERTS ACCORDING TO THE PRESENT INVENTION | | | | | | | | | | | | |
| 1 | 81.8 | 0.2 | 3.0 | TiC: 10 | MgO: 5 | 70/30 | 93.5 | TiC | 5 | — | — | 0.15 |
| 2 | | | | | | | | TiCN | 1 | — | — | 0.22 |
| 3 | | | | | | | | TiCN | 9.5 | — | — | 0.18 |
| 4 | | | | | | | | TiN | 5 | — | — | 0.17 |
| 5 | | | | | | | | TiN | 5 | Al₂O₃ | 1 | 0.13 |
| 6 | | | | | | | | TiN | 5 | Al₂O₃ | 4 | 0.10 |
| 7 | 87.9 | 0.1 | 6.0 | ZrC: 4 | CaO: 2 | 80/20 | 93.4 | TiCNO | 5 | — | — | 0.15 |
| 8 | 77.7 | 0.3 | 7.5 | TaN: 12 | Li₂O: 2.5 | 50/50 | 93.3 | TiC | 5 | — | — | 0.16 |
| 9 | 75.8 | 0.2 | 7.0 | (Ti, W)CN: 10 | Y₂O₃: 7 | 40/60 | 93.3 | TiC (inner layer) / TiN (outer layer) | 2 / 3 | — | — | 0.18 |
| 10 | 80.0 | — | 6.0 | HfC: 7 | Er₂O₃: 7 | 90/10 | 92.9 | TiCN (inner layer) / TiCNO (outer layer) | 3 / 2 | — | — | 0.17 |
| 11 | 81.3 | 0.7 | 8.5 | (Ti, V)CN: 3.5 | Na₂O: 1; MgO: 5 | 15/85 | 93.2 | TiCO | 1 | Al₂O₃ | 1 | 0.11 |
| 12 | 69.0 | — | 9.5 | NbC: 4.5 | MgO: 5; Y₂O₃: 12 | 85/15 | 92.7 | TiC (inner layer) / TiCN (intermediate) / TiN (outer layer) | 2 / 3 / 2 | — | — | 0.19 |
| 13 | 68.3 | 0.7 | 8.0 | (Ti, Mo)C: 10 | MgO: 5; Y₂O₃: 8 | 94/6 | 92.8 | TiC (inner layer) / TiCN (outer layer) | 4 / 2 | — | — | 0.15 |
| 14 | 79.9 | 0.1 | 7.0 | (Ti, W)CN: 5 | La₂O₃: 3; Y₂O₃: 5 | 60/40 | 93.0 | TiC (inner layer) / TiCNO (outer layer) | 4 / 2 | — | — | 0.14 |
| 15 | 75.6 | 0.4 | 6.0 | (Ti, W)CN: 10 | La₂O₃: 3; Y₂O₃: 5 | 15/85 | 92.8 | TiC (inner layer) / TiCO (outer layer) | 3 / 1 | Al₂O₃ | 2 | 0.17 |
| 16 | 66.6 | 0.4 | 5.0 | (Ti, W)CN: 20 | La₂O₃: 3; Y₂O₃: 5 | 5/95 | 92.7 | TiC | 5 | AlNO | 1 | 0.15 |
| 17 | 57.2 | 0.3 | 4.5 | (Ti, W)CN: 30 | La₂O₃: 3; Y₂O₃: 5 | 10/90 | 92.6 | TiCO | 2 | — | — | 0.18 |
| 18 | 78.9 | 0.1 | 5.0 | TiCNO: 10 | MgO: 3; Y₂O₃: 3 | 50/50 | 93.3 | TiC | 2 | — | — | 0.20 |

TABLE 1-continued

| SPECIMEN | COMPOSITION OF MATRIX (% BY VOLUME) | | | CUBIC STRUCTURE COMPOUNDS | COMPOUNDS AS COMBINED PHASEFORMING COMPONENTS | MATRIX | | HARD COATING LAYER OF COMPOUNDS OF 4a GROUP METALS | | HARD COATING LAYER OF COMPOUNDS OF Al | | FLANK WEAR (mm) |
|---|---|---|---|---|---|---|---|---|---|---|---|---|
| | $Si_3N_4$ | $Al_2O_3$ | AlN | | | $\alpha/\beta$ RATIO | HARDNESS ($H_{RA}$) | COMPOSITION | LAYER THICKNESS ($\mu m$) | COMPOSITION | LAYER THICKNESS ($\mu m$) | |
| 19 | 75.7 | 0.3 | 8.0 | TiCNO: 10 | YN: 5 MgO: 3 | 20/80 | 93.5 | TiC | 1 | — | — | 0.23 |
| 20 | 75.7 | 0.3 | 8.0 | TiN: 10 | YN: 5 MgO: 3 | 15/85 | 93.3 | TiC | 9 | — | — | 0.18 |
| CONVENTIONAL CUTTING INSERTS | | | | | | | | | | | | |
| 1 | $Al_2O_3$ - 0.5% MgO | | | | | — | 93.0 | — | | — | | chipped |
| 2 | $Al_2O_3$ - 25% TiC | | | | | — | 93.7 | — | | — | | chipped |

Then, each of the matrices according to the present invention was tested in respect of hardness (Rockwell Hardness: A scale), and also had its volumetric ratio of the α-Sialon/the β-Sialon examined by means of microscopic analysis and x-ray diffraction. Then, the matrices were cut into cutting inserts according to SNGN 432, and the cutting inserts were each subjected to grinding and honing. Then, the cutting inserts were each heated in an Inconel reaction tube having a diameter of 180 mm, while at the same time introducing into the Inconel reaction tube a reaction mixed gas having a composition corresponding to the composition of a hard coating layer to be formed, shown in Table 2. The heating was carried out under atmospheric pressure at a reaction temperature of 1000° C. to form hard coating layers of the compounds of 4a group metals, under a reduced pressure of 100 torr at a reaction temperature of 1000° C. to form hard coating layers of $Al_2O_3$, and under a reduced pressure of 0.5 torr at a temperature of 800° C. to form hard coating layers of AlNO, respectively, for a retention time falling within a range from 5 to 30 hours depending upon the mean layer thickness. Thus, the hard coating layers having compositions and mean layer thicknesses shown in Table 1 were formed over the surfaces of the cutting inserts cut from the matrices, to thereby obtain surface coated cutting inserts Nos. 1-20 as surface coated Sialon-base ceramic materials for tools according to the present invention.

Then, the surface coated cutting inserts Nos. 1-20 according to the present invention were subjected to a cost iron-high speed cutting test under the following conditions:
Work Material: Round Bar of Cast Iron (FC 30);
Cutting Speed: 400 m per minute;
Depth of Cut: 2.5 mm;
Feed Rate: 0.3 mm per rev.;
Cutting Time: 5 minutes.

TABLE 2

| COMPOSITION OF HARD COATING LAYER | COMPOSITION OF REACTION MIXED GAS (% BY VOLUME) | | | | | | |
|---|---|---|---|---|---|---|---|
| | $H_2$ | $TiCl_4$ | $CH_4$ | CO | $N_2$ | $AlCl_3$ | $CO_2$ |
| COMPOUNDS OF 4a GROUP METALS | | | | | | | |
| TiC | 96 | 2 | 2 | — | — | — | — |
| TiN | 92 | 2 | — | — | 6 | — | — |
| $TiC_{0.2}N_{0.8}$ | 92 | 2 | 1 | — | 5 | — | — |
| $TiC_{0.5}O_{0.5}$ | 97 | 2 | — | 1 | — | — | — |
| $TiC_{0.2}N_{0.6}O_{0.2}$ | 92 | 2 | — | 1 | 5 | — | — |
| COMPOUNDS OF Al | | | | | | | |
| $Al_2O_3$ | 95 | — | — | — | — | 2 | 3 |
| AlNO | 90 | — | — | — | — | 3 | 2 |

In the above cutting test, the flank wear of each cutting insert was measured. The results of the measurements are shown in Table 1. Also shown in Table 1 are the results of another cutting test which was conducted, under the same testing conditions as above, on cutting inserts cut from $Al_2O_3$-base ceramic materials sold on the market (hereinafter called "the conventional cutting inserts Nos. 1 and 2).

It will be learned from Table 1 that the cutting inserts Nos. 1-20 according to the present invention show very excellent wear resistance and accordingly long service life as cutting tools, while the conventional cutting inserts Nos. 1 and 2 chipped due to insufficient toughness, showing that they cannot be applied to practical use.

EXAMPLE 2

The same starting powders as those of Example 1 were prepared, and these starting powders were blended into the following composition:
$Si_3N_4$: 86.6 percent by volume;
$Al_2O_3$: 0.3 percent by volume;
AlN: 5.1 percent by volume;
TiN: 4.0 percent by volume;
MgO: 4.0 percent by volume.

Paraffin was added as a binder to the blended powder in an amount equal to 3 percent by weight of the total weight of the blended powder, and the blended powder was subjected to mixing and micronizing in a wet-type ball mill for 72 hours, and then dried. Then, the resulting mixture was compressed under a pressure of 1.2 tons/cm² into a green compact. The green compact was heated in a vacuum at a temperature of 800° C., for a retention time of 1 hour, and then subjected to sintering in a state buried in powder of $Si_3N_4$ in an atmospheric nitrogen ($N_2$) gas under 1 atmospheric pressure at a temperature of 1750° C., for a retention time of 2 hours, to obtain a Sialon-base ceramic matrix according to the present invention. A cutting insert was obtained from the matrix and processed under the same conditions as in Example 1, and then the cutting insert was subjected to hard layer coating under the same conditions as in Example 1, whereby its surface was coated with a hard coating layer of TiCO having a mean layer thickness of 5 μm, to obtain a surface coated cutting insert No. 21 according to the present invention.

The cutting insert No. 21 according to the present invention and a conventional cutting insert No. 3 for comparison sold on the market whose composition is $Al_2O_3$ — 30 percent by volume TiC were then subjected to a cutting test under the following conditions:
Work Material: Automobile Brake Disc of Cast Iron (FC 25);
Depth of Cut: 3 mm;
Feed Rate: 0.5 mm per rev.;
Cutting Speed: 600 m per minute;
Cutting Oil: not used;
Net Cutting Time: 15 sec. per piece.

In the above cutting test, it was checked how many pieces had been cut before the effective life of the surface coated cutting insert No. 21 according to the present invention and the conventional cutting insert No. 3 ended. While the cutting insert No. 21 according to the present invention could cut 150 pieces, the conventional cutting insert No. 3 could cut only 50 pieces.

EXAMPLE 3

Two further cutting inserts were cut from the Sialon-base ceramic matrix prepared in Example 2 and processed under the same conditions as in Example 1. On surfaces of these cutting inserts were formed a hard coating layer of ZrN having a mean layer thickness of 8 μm, and a hard coating layer of HfN having a mean layer thickness of 6 μm, to obtain surface coated cutting inserts Nos. 22 and 23 according to the present invention. The ZrN hard coating layer was formed on the surface of the cutting insert No. 22 under a pressure of 200 torr within the reaction tube, at a temperature of 1050° C., and by means of a reaction mixed gas having a composition of 92 percent by volume $H_2$, 2 percent by volume $ZrCl_4$, and 6 percent by volume $N_2$. The HfN hard coating layer was formed on the surface of the cutting insert No. 23 under a pressure of 200 torr within the reaction tube, at a temperature of 1070° C., and by means of a reaction mixed gas having a composition of 92 percent by volume $H_2$, 2 percent by volume $HfCl_4$, 6 percent by volume $N_2$.

The thus obtained surface coated cutting inserts Nos. 22 and 23 according to the present invention having the ZrN hard coating layer, and the HfN hard coating layer, respectively, were subjected to a cast iron-high speed cutting test under the following conditions:
Work Material: Round Bar of Cast Iron (FC 30);
Depth of Cut: 2.5 mm;
Cutting Speed: 400 m per minute;
Feed Rate: 0.3 mm per rev.;
Cutting Time: 5 minutes In the above cutting test, the flank wear of each cutting insert was measured. The results of the measurements were 0.31 mm for the cutting insert No. 22, and 0.18 mm for the cutting insert No. 23, thus showing that both the cutting inserts have excellent wear resistance.

As stated above, surface coated Sialon-base ceramic materials for tools according to the present invention possess excellent wear resistance. Therefore, they can exhibit excellent performance as cutting tools over a long period of time.

What is claimed is:

1. A surface coated sialon-base ceramic material for wear resistant tools, comprising:
   a sialon-base ceramic matrix which consists essentially of
   (a) 3–30 percent by volume of at least one selected from the group consisting of the carbide of each of the metals exclusive of Cr in the groups 4a, 5a, and 6a of the periodic table of elements, nitride thereof, oxide thereof, and solid solution of at least two of said carbide, said nitride, and said oxide;
   (b) 1–20 percent by volume at least one combined phase-forming component selected from the group consisting of the oxide of Li, Na, Ca, Mg, Y, any rare earth element, Si, and Al, and nitride thereof; and
   (c) the balance of β-sialon expressed by the chemical formula $Si_{6-z}Al_zO_zN_{8-z}$, z being larger than 0 but not more than 4.3, and α-sialon expressed by the chemical formula $M_x(Si,Al)_{12}(O,N)_{16}$, x being larger than 0 but not more than 2, M representing at least one selected from the group consisting of Li, Na, Ca, Mg, Y, and any rare earth element, and inevitable impurities, wherein the ratio of the α-sialon/β-sialon is within a range from 5/95 to 95/5 in volume; and
   at least one hard first coating layer formed on a surface of said matrix, said at least one hard coating layer being formed of at least one selected from the group consisting of carbide of Ti, Zr, and Hf, nitride thereof, carbo-nitride thereof, carbo-oxide thereof, and carbo-nitro-oxide thereof.

2. A surface material of claim 1, further including at least one second hard coating layer formed on a surface of said first hard coating layer, said second hard coating layer consisting essentially of at least one selected from the group consisting of the oxide of Al and nitro-oxide thereof, and wherein said first hard coating layer is an intermediate layer between said matrix and said second hard coating layer as a surface layer.

3. The material of claim 2, wherein said second hard coating layer has a mean thickness of from 0.5 to 5 μm.

4. The material of claim 2, wherein said first hard coating layer has a mean thickness of from 0.5 to 10 μm.

5. The material of claim 4, wherein said second hard coating layer has a mean thickness of from 0.5 to 5 μm.

6. The material of claim 2, wherein in the component (a), said at least one metal selected from the groups 4a, 5a, and 6a of the periodic table of elements is selected from the group consisting of Ti, Zr, Ta, V, Nb, W, Mo and Hf; and wherein the metal of said phase-forming component (b) is selected from the group consisting of Na, Mg, Ca, Li, Y, La and Er.

7. The material of claim 6, wherein said component (a) is selected from the carbide of each of said metals, nitride thereof, and solid solution of said carbide and said nitride and wherein said phase-forming component (b) is selected from the oxide of each of said metals.

8. The material of claim 7, wherein said first coating layer is selected from the group consisting of the carbide of Ti, nitride thereof, carbo-nitride thereof, carbo-oxide thereof, and carbo-nitro-oxide thereof.

9. The material of claim 8, wherein the ratio of the α-sialon/β-sialon is from 25/75 to 95/5 by volume, wherein z is larger than 0 but not more than 2.0, and wherein said at least one combined phase-forming component is contained in an amount from 2 to 10 percent by volume.

10. The material of claim 9, wherein said first hard coating layer has a mean thickness of from 0.5 to 10 μm; and wherein said second hard coating layer has a mean thickness of from 0.5 to 5 μm.

11. The material of claim 6, wherein the ratio of the α-sialon/β-sialon is from 25/75 to 95/5 by volume, wherein z is larger than 0 but not more than 2.0, and wherein said at least one combined phase-forming component is contained in an amount from 2 to 10 percent by volume; wherein said first hard coating layer has a mean thickness of from 0.5 to 10 μm; and wherein said second hard coating layer has a mean thickness of from 0.5 to 5 μm.

12. The material of claim 11, wherein said first coating layer is selected from the group consisting of the carbide of Ti, nitride thereof, carbo-nitride thereof, carbo-oxide thereof, and carbo-nitro-oxide thereof.

13. The material of claim 1, wherein said first hard coating layer has a mean thickness of from 0.5 to 10 μm.

14. The material of claim 13, wherein said second hard coating layer has a mean thickness of from 0.5 to 5 μm.

15. The material of claim 1, wherein the ratio of the α-sialon/β-sialon is from 25/75 to 95/5 by volume.

16. The material of claim 1, wherein z is larger than 0 but not more than 2.0.

17. The material of claim 1, wherein said at least one combined phase-forming component is contained in an amount from 2 to 10 percent by volume.

18. The material of claim 1, wherein in the component (a) said at least one metal selected from the groups 4a, 5a, and 6a of the periodic table of elements is selected from the group consisting of Ti, Zr, Ta, V, Nb, W, Mo and Hf; and wherein the metal of said phase-forming component (b) is selected from the group consisting of Na, Mg, Ca, Li, Y, La and Er.

19. The material of claim 18, wherein said component (a) is selected from the carbide of each of said metals, nitride thereof, and solid solution of said carbide and said nitride and wherein said phase-forming component (b) is selected from the oxide of each of said metals.

* * * * *